United States Patent [19]

Backhouse

[11] 4,268,547
[45] May 19, 1981

[54] COATING PROCESS

[75] Inventor: Alan J. Backhouse, South Ascot, England

[73] Assignee: Imperial Chemical Industries Limited, London, England

[21] Appl. No.: 66,298

[22] Filed: Aug. 13, 1979

Related U.S. Application Data

[63] Continuation of Ser. No. 897,172, Apr. 17, 1978, abandoned.

[30] Foreign Application Priority Data

Jul. 19, 1977 [GB] United Kingdom ............... 30236/77

[51] Int. Cl.$^3$ .......................... B05D 1/02; B05D 7/16
[52] U.S. Cl. ................................ 427/385.5; 427/388.5
[58] Field of Search ............... 427/385 R, 388 D, 401, 427/407 R, 409, 385.5, 388.5, 407.1

[56] References Cited

U.S. PATENT DOCUMENTS

| 4,025,474 | 5/1977 | Porter et al. | 260/22 CQ |
| 4,075,141 | 2/1978 | Porter et al. | 260/17.2 |
| 4,115,472 | 9/1978 | Porter et al. | 260/836 |
| 4,137,208 | 1/1979 | Elliott | 260/29.6 RB |

FOREIGN PATENT DOCUMENTS 1242054 8/1971 United Kingdom .
1319781 6/1973 United Kingdom .
1451948 10/1976 United Kingdom .

Primary Examiner—James R. Hoffman
Attorney, Agent, or Firm—Cushman, Darby & Cushman

[57] ABSTRACT

Improved application characteristics of spray-applied coatings, particularly for automobile bodies, are obtained when the composition applied comprises (A) a film-forming polyester or alkyd resin, (B) a volatile liquid solvent for the resin and (C) polymer microparticles which are stably dispersed in the solution of the resin in the solvent.

Improvements observed include increased resistance to "sagging."

6 Claims, No Drawings

COATING PROCESS

This is a continuation, of application Ser. No. 897,172 filed Apr. 17, 1978, now abandoned.

This invention relates to a process for the production of protective and decorative coatings upon surfaces, particularly the surfaces of automobile bodies.

It is well known to formulate coating compositions, especially those for use in the automobile industry, upon polyester resins. Such resins may be of the air-drying alkyd type, containing autoxidisable groupings derived from natural drying oils, in which case curing of the resin to form a film occurs by the action of atmospheric oxygen. Alternatively, they may contain no autoxidisable groupings but instead rely for curing upon the reaction of residual hydroxyl or carboxyl groups present with a cross-linking agent such as an amino resin, effected in a curing step subsequent to the application of the coating composition to the substrate. A combination of both curing mechanisms is frequently utilised. These polyester-based compositions, however, give rise to certain difficulties, especially under the conditions of spray application as normally used in the painting of car bodies. In those cases where such a composition is employed for the final finishing of the car body, the need to achieve good flow-out of the coating after application, in order to maximise gloss, may require the incorporation of film-forming components of very low molecular weight; these, however, tend to cause excessive flow of the composition during the spraying operation, with the occurrence of "sagging."

It has now been found that an improvement in the spray application properties of a coating composition based on a polyester resin can be achieved by incorporating in the composition a proportion of polymer microparticles of specified type.

According to the present invention there is provided a process for the production of a surface coating upon a substrate which comprises applying by spray to the substrate surface a composition comprising (A) a film-forming polyester resin as hereinafter defined; (B) a volatile organic liquid diluent in which the polyester resin (A) is dissolved; (C) polymer microparticles as hereinafter defined, in an amount of at least 3% of the aggregate weight of the resin (A) and the microparticles, which are insoluble in and stably dispersed in the solution of the polyester resin (A) in the diluent (B), and subsequently evaporating the volatile diluent to form a polymer film upon the surface.

By the term "film-forming polyester resin" we mean any of those resins which are known in the art for use in surface coating compositions and which are essentially the products of condensation of polyhydric alcohols and polycarboxylic acids. We include in this term the alkyd resins which are obtained from such starting materials with the addition of constituents supplying residues of fatty acids derived from natural drying oils, or semi-drying oils, or even oils having no air-drying capabilities. We also include polyester resins not incorporating any natural oil residues. All these resins normally contain a proportion of free hydroxyl and/or carboxyl groups which are available for reaction with suitable cross-linking agents, which are discussed in more detail below. Where a cross-linking agent is employed, this is, for the purposes of the foregoing definition of the invention, considered to be a part of the film-forming constituent (A).

Suitable polyhydric alcohols for the production of polyester resins include ethylene glycol, propylene glycol, butylene glycol, 1:6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexane triol, oligomers of styrene and allyl alcohol (for example that sold by Monsanto Chemical Company under the designation RJ 100) and the condensation products of trimethylolpropane with ethylene oxide or propylene oxide (such as the products known commercially as "Niax" triols). Suitable polycarboxylic acids include succinic acid (or its anhydride), adipic acid, azelaic acid, sebacic acid, maleic acid (or its anhydride), fumaric acid, muconic acid, itaconic acid, phthalic acid (or its anhydride), isophthalic acid, terephthalic acid, trimellitic acid (or its anhydride) and pyromellitic acid (or its anhydride). Where it is desired to produce air-drying alkyd resins, suitable drying oil fatty acids which may be used include those derived from linseed oil, soya bean oil, tall oil, dehydrated castor oil, fish oils or tung oil. Other oil fatty acids, of semi-drying or non-drying types, which may be used include those derived from safflower oil, sunflower oil and cottonseed oil. Normally it is preferred that the oil length of such an alkyd resin should not exceed 50%. Monofunctional saturated carboxyl acids may also be incorporated in order to confer plasticity on the polyester. Such acids may be, for example, $C_4$–$C_{20}$ saturated aliphatic acids benzoic acid, p-tertbutyl benzoic acid and abietic acid; these may, in fact, be the only fatty acids present, in those cases where the polyester resin is to be cured by subsequent reaction of residual hydroxyl or carboxyl groups with a cross-linking agent. In addition, monofunctional hydroxy compounds may be incorporated in order to control the chain length of the polyester or to confer certain desirable compatibility properties upon it; suitable monohydroxy compounds include benzylalcohol, cyclohexyl alcohol, saturated or unsaturated fatty alcohols and condensation products of ethylene oxide or propylene oxide with monofunctional alcohols (e.g. the methoxy-polyethylene glycol obtained by reaction of ethylene oxide with methanol).

Suitable film-forming polyester resins also include "modified" alkyd resins, for example styrenated or methacrylated alkyds, urethane alkyds and epoxy alkyds.

The volatile organic liquid constituent (B) of the composition used in the process may be any of the liquids, or mixtures of liqiuds, which are conventionally used as polymer solvents in coating compositions, for example aromatic hydrocarbons such as toluene and xylene and petroleum fractions of various boiling point ranges having a significant aromatic content, esters such as butyl acetate, ethylene glycol diacetate and 2-ethoxyethyl acetate, ketones such as acetone and methyl isobutyl ketone, and alcohols such as butyl alcohol. The actual liquid or mixture of liquids selected as the diluent (B) will depend upon the nature of the polyester resin (A), according to principles which are well known in the coatings art, in order that the resin shall be soluble in the diluent.

The polymer microparticles (C) present in the composition used according to the invention are polymer particles of colloidal dimensions, having a diameter of from 0.01–10 microns, which are insoluble in the solution of the polyester resin (A) in the diluent (B) and which are stably dispersed therein (in the sense that they do not undergo flocculation or aggregation) whilst dispersed in that medium. The insolubility of the microparticles may be achieved by suitable selection of the composition of the microparticle polymer, that is to say, the polymer may be one which is inherently insoluble in that solution, but preferably it is achieved by introducing a sufficient degree of cross-linking into a polymer which, if not cross-linked, would actually be soluble in the solution of the polyester resin (A) in the diluent (B). Where insolubility of the microparticles is achieved through cross-linking, it is preferred that the degree of cross-linking should not be greater than that necessary to render the polymer insoluble. Insolubility of the microparticles in the solution of polyester resin (A) in diluent (B) may be checked by means of the following test. The microparticles (1 part by weight) are shaken for 30 minutes with diluent (B) (100 parts by weight); the suspension is then centrifuged at 17,000 r.p.m. for 30 minutes. The supernatant liquid is decanted off and the residual polymer then dried for 30 minutes at 150° C., after which its weight is compared with that of the microparticles originally taken. This test may be difficult to apply where the specific gravity of the diluent is close to or greater than that of the microparticles, but such diluents (e.g. chlorinated solvents) would not normally be used in the compositions under consideration. Where the result of this test indicates that the microparticles are acceptably insoluble in the diluent (B) alone, it can be assumed that the particles will be at least equally insoluble when the polyester resin (A) is also present in solution in the diluent; there would be practical difficulties in carrying out the test actually in a solution of polyester resin (A) in diluent (B).

The microparticulate polymer may be of various types. It may, for example, be an addition polymer, derived from one or more ethylenically unsaturated monomers; in particular, it may be a polymer or copolymer of one or more alkyl esters of acrylic acid or methacrylic acid, optionally together with other monomers such as vinyl acetate, acrylonitrile, styrene, acrylic acid or methacrylic acid. Suitable acrylic and methacrylic esters include methyl methacrylate, ethyl methacrylate, propyl methacrylate, butyl methacrylate, ethyl acrylate, butyl acrylate and 2-ethylhexyl acrylate. Where it is desired that such a polymer should be cross-linked, this may be achieved by either of two general methods: firstly, by including in the monomers from which the polymer is derived a minor proportion of a monomer which is polyfunctional with respect to the polymerisation reaction, e.g. ethylene glycol dimethacrylate or divinylbenzene; or secondly, by including in those monomers minor proportions of two other monomers carrying pairs of chemical groupings which can be caused to react with one another either during or after the polymerisation reaction, such as epoxy and carboxyl (e.g. glycidyl methacrylate and methacrylic acid), anhydride and hydroxyl or isocyanate and hydroxyl. Alternatively, the microparticles may be composed of a condensation polymer, for example a polyester prepared from any of the polyhydric alcohols and polycarboxylic acids described above. Again, such polymers may be cross-linked if desired, by the incorporation of materials of functionality greater than two, in the starting composition, although in this case, because of the characteristically broad distribution of molecular species formed in a condensation polymerisation, it may be difficult to ensure that all those species are in fact cross-linked.

The chemical compositions and degree of cross-linking of the microparticulate polymer may be such that it has a Tg (glass-rubber transition temperature) below room temperature, in which case the microparticles will be rubbery in nature; alternatively it may be such that the Tg is above room temperature, that is to say the particles will be hard and glassy.

As already stated, it is necessary that the polymer microparticles be stably dispersed in the solution of the polyester resin in the liquid diluent. By "stably dispersed" is meant that the particles are prevented from flocculating or aggregating by means of a steric barrier around the particles, of polymer chains which are solvated by the said solution and hence are in a chain-extended configuration. In this context the term "solvated" implies that the polymer chains in question, if they were independent molecules, would be actually soluble in the polyester resin solution; however, because the chains are in fact attached to the microparticles at one or more points along their length; the steric barrier remains permanently attached to the particles. It will be understood that the stabilising polymer chains to be used in any particular instance will be selected with reference to the nature of the liquid diluent and film-forming polyester resin concerned. In general terms this means that the chains will be of a degree of polarity similar to that of the diluent and film-forming resin, so that the combination of the latter will be inherently a solvent for the polymer of which the chains are composed. Since, in the automobile finishes to which the present invention is primarily directed, the liquid diluent will conventionally be of a relatively high degree of polarity (containing, for example, a substantial proportion of "strong" ester and ketone solvents) it follows that the stabilising chains on the microparticles will usually require to be of a composition such that they are inherently soluble in that type of liquid.

The mode of anchoring of the stabilising chains to the microparticles is conveniently discussed in connection with methods of making the particles, as follows.

The polymer microparticles may be produced in a variety of ways. Preferably they are produced by the dispersion polymerisation of monomers, in an organic liquid in which the resulting polymer is insoluble, in the presence of a steric stabiliser for the particles. Suitable processes of dispersion polymerisation are well-known and extensively described in the literature. Thus, so far as the dispersion polymerisation of ethylenically unsaturated monomers such as acrylic or methacrylic acid esters, vinyl esters and styrene or its derivatives are concerned, the procedure is basically one of polymerising the monomers in an inert liquid in which the monomers are soluble but the resulting polymer is not soluble, in the presence dissolved in the liquid of an amphipathic stabilising agent or of a polymeric precursor which, by copolymerisation or grafting with a portion of the monomers, can give rise in situ to such a stabilising agent. Reference may be made, for example, to British Pat. Specifications Nos. 941,305; 1,052,241; 1,122,397 and 1,231,614 for a general description of the principles involved, as well as to "Dispersion Polymerisation in Organic Media," ed. K. E. J. Barrett (John Wiley and Sons, 1975). Suitable ethylenically unsaturated monomers include methyl methacrylate, ethyl methacrylate, butyl methacrylate, ethyl acrylate, butyl acrylate, 2-hydroxyethyl acrylate, vinyl acetate, vinyl propionate, styrene and vinyl toluene. The production specifically of dispersions of cross-linked addition polymer particles can be achieved by including, in the monomers selected, pairs of monomers containing (in addition to the polymerisable unsaturated groups) groups capable of entering into chemical reaction with each other; for example, the epoxide and carboxyl groups contained in glycidyl methacrylate and methacrylic acid. By following the procedures particularly described in British Pat. Specifications Nos. 1,095,288 and 1,156,012, for example, particles are obtained in which there are present such complementary groups which, although not at that stage co-reacted, can be caused to co-react and so form cross-links by subsequently heating the dispersion to a suitably elevated temperature. Cross-linked addition polymers may also be prepared in dispersion by including in the monomers undergoing dispersion polymerisation a minor proportion of a monomer which is difunctional with respect to the polymerisation reaction, such as ethyleneglycol dimethacrylate or divinylbenzene.

Of the unsaturated monomers mentioned above, methyl methacrylate is an appropriate choice where it is desired that the polymer microparticles should have a high Tg value. Where the microparticles are required to be of low Tg, ethyl acrylate or vinyl acetate may be used, but it may be a more convenient alternative to copolymerise methyl methacrylate with minor proportions of "softening" monomers such as butyl acrylate or butyl methacrylate. The proportions used of such softening monomers may, however, need to be limited; otherwise there is a risk that the resulting copolymer may be too soluble, even in low-polarity hydrocarbon diluents, for stable dispersion of microparticles to be obtained. With butyl acrylate as the softening monomer, for example, a proportion of 15% by weight of the total monomers should not be exceeded. Certain other softening monomers such as 2-ethoxyethyl acrylate or 2-ethoxyethyl methacrylate, may be used in greater proportions than this if desired, but these monomers are not as readily accessible as the corresponding lower alkyl esters. Small proportions of comonomers incorporating carboxyl groups, e.g. acrylic acid or methacrylic acid may be included (where the microparticles are to be cross-linked, such proportions would be in excess of those used in order to achieve crosslinking by reaction with a co-reactive monomer such as glycidyl methacrylate). Conversely, small (additional) proportions of an epoxide monomer, e.g. glycidyl methacrylate, may be included. Other functional monomers, such as hydroxyethyl acrylate or acrylamide, may also be included in minor proportions in the monomers from which the microparticles are to be derived.

The production of dispersions of condensation polymers is described, for example, in British Pat. Specifications Nos. 1,373,531; 1,403,794 and 1,419,199 and methods of obtaining cross-linked polymer particles are included in these descriptions. The general principles involved here are the same as those referred to above in connection with addition polymer dispersions, but there is a difference of detail arising from the commonly more highly polar nature of the monomers or starting materials from which condensation polymers are derived. This is, namely, that the monomers in question are usually insoluble in the inert liquid in which the polymerisation is to be carried out. Accordingly the first step in the dispersion polymerisation of the monomers is to bring them into a state of colloidal dispersion in the inert liquid, either as liquid or as solid particles. In the second step, polymerisation of the monomers take place within those same particles. An amphipathic stabilising agent is required in each stage, firstly in order to stabilise the particles of monomer and secondly in order to stabilise the particles of polymer formed, but in suitable cases a single stabilising agent can be found which will perform both these functions. In place of using a preformed amphipathic stabilising agent in this process, there may be employed instead a suitable polymeric precursor which, by copolymerisation or grafting with a portion of the monomers being polymerised, can give rise to such a stabilising agent in situ. Reference may be made in this connection to British patent application No. 19487/76.

Suitable monomeric starting materials for preparing condensation polymer microparticles are those which are well known for use in making such polymers by melt or solution polymerisation techniques. For example, suitable materials in the case of polyester microparticles are the polyhydric alcohols and polycarboxylic acids mentioned above in connection with the film-forming polyester resin (A). In the case of polyamide microparticles, suitable monomeric starting materials are amino-acids, such as 6-aminocaproic acid or 11-aminoundecanoic acid, or the corresponding lactams, and/or polyamines, such as ethylene diamine, propylene diamine, hexamethylene diamine, diethylene triamine, triethylene tetramine or tris (aminoethyl) methane, in conjunction with the polycarboxylic acids mentioned above. It will, of course, be understood that, in the case of both polyester and polyamide microparticles, the mixture to be polymerised must incorporate some proportion of a starting monomer which has a functionality greater than two, where it is desired that the microparticles should be cross-linked.

In all the above-described dispersion polymerisation processes, the amphipathic steric stabilising agent is a substance the molecule of which contains a polymeric component which is solvatable by the liquid in which the dispersion is made and another component which is relatively non-solvatable by that liquid and is capable of associating with the polymer particles produced. Such a stabilising agent will be soluble as a whole in the dispersion liquid, but the resulting solution will usually contain both individual molecules and micellar aggregates of molecules, in equilibrium with each other. The type of stabilising agent preferred for use in the invention is a block or graft copolymer containing in the molecule two types of polymeric component: one type consists, as stated above, of polymer chains which are solvatable by the dispersion liquid and the other type consists of polymer chains of different polarity from the first type which accordingly are not solvatable by that liquid and are capable of becoming anchored to the polymer microparticles. A particularly useful form of such a stabilising agent is a graft copolymer comprising a polymer backbone, which is the non-solvatable or "anchor" component, and a plurality of solvatable polymer chains pendant from the backbone. Specific examples of such graft copolymers include those in which the backbone is an acrylic polymer chain, derived predominantly from methyl methacrylate, and the pendant chains are residues of poly (12-hydroxystearic acid) which are readily solvatable by an aliphatic hydrocarbon medium. These copolymers may be made, for example, by first reacting poly(12-hydroxystearic acid) with glycidyl acrylate or glycidyl methacrylate, whereby the terminal —COOH group in the polymeric acid is converted to an ester derivative containing a polymerisable unsaturated grouping, and then copolymerising that derivative with methyl methacrylate, optionally together with minor proportions of other copolymerisable monomers. By employing acrylic acid or methacrylic acid as such minor comonomers, it is possible to introduce carboxyl groups into the backbone chain of the graft copolymer with beneficial results inasmuch as the backbone is thereby rendered more polar than it is if composed of methyl methacrylate units alone. This increased polarity causes the backbone to be even less solvatable by a non-polar diluent such as an aliphatic hydrocarbon, and in consequence enhances the force whereby it becomes anchored to the microparticle.

Although it is preferred to prepare the polymer microparticles by means of dispersion polymerisation processes as just described, it may be necessary to subject the particles so obtained to a further treatment in order to render them suitable for incorporation in the compositions used according to the invention. This need may arise in the following way. The most convenient inert liquids in which to carry out dispersion polymerisations are liquids of low polarity, for example aliphatic or aromatic hydrocarbons or mixtures thereof; this is because such liquids are non-solvents for the majority of polymers, whether of the addition or of the condensation type, and therefore, give scope for the widest choice of polymer or copolymer compositions according to the properties which it is desired the microparticles should possess. From the foregoing discussion it will, however, be appreciated that steric stabilising agents which are suitable for stabilising the microparticles in a simple low polarity liquid environment may no longer effectively stabilise them when they are transferred to the environment of the solution of the film-forming polyester resin (A) in the liquid diluent (B). One relevant factor is that (B) is likely to be a relatively higher polar liquid, where the formulation of automobile finishes is concerned, and another, perhaps more important, factor is that the polyester molecules (A) will now be competing with the chains of the stabilising agent for the solvating action of the diluent. The consequence is that transfer of the microparticles to the new environment will result in their de-stabilisation and flocculation.

It is, therefore, a preferred feature of the invention that microparticles which have been made by a dispersion polymerisation process are further associated with a polymer which is soluble in the volatile organic liquid constituent (B) of the base-coat composition and is also compatible with the film-forming polyester resin (A). This further polymer, hereinafter referred to as the "auxiliary" polymer, is essentially non-crosslinked. It is believed that, when microparticles with which it is associated are introduced into the more highly polar environment of the solution of film-forming polyester resin (A) in the organic liquid (B), the chains of the auxiliary polymer now become solvated and take over at least in part from the original amphipathic stabiliser the function of maintaining the microparticles in a deflocculated, dispersed state. The scope of the present invention is not, however, in any way limited by the extent to which this belief is correct. The microparticles are most conveniently brought into association with the auxiliary polymer by following up the dispersion polymerisation process immediately with the polymerisation of further monomer, from which the auxiliary polymer is to be derived, in the original inert liquid medium and in the presence of the original stabilising agent.

In general, the auxiliary polymer will be required to have a composition such that it is compatible with the film-forming polyester resin (A). The monomer or monomers from which the auxiliary polymer is to be derived will be chosen with this requirement in mind, as will be apparent to those skilled in the art.

On introducing the microparticles so treated into the solution of the polyester resin (A) in the liquid (B), part of the auxiliary polymer may be dissolved away by that more polar medium, but it is believed that a substantial portion of the auxiliary polymer chains remains attached to the microparticles (albeit now solvated by the medium), for example by virtue of their having become entangled with the chains of the microparticle polymer during their formation, or as a result of actual grafting on to those chains. If desired, the stability of the treated microparticles in the more polar medium may be enhanced by ensuring that covalent linkages are developed between the chains of the auxiliary polymer and those of the miroparticles. This may be done, for example, by including an unsaturated carboxylic acid in the monomers from which the auxiliary polymer is derived. The carboxyl groups so introduced are able to react with epoxide groups, present in the microparticle polymer as the result of the use of a slight excess of the latter groups for the purpose of cross-linking that polymer by reaction with carboxyl groups in the manner described above.

The incorporation of the microparticles, made by dispersion polymerisation, into the coating composition may be effected by blending the dispersion of the microparticles (whether treated with auxiliary polymer or not) with a solution of the film-forming polyester resin (A) in a suitable diluent (B). Another possibility is to separate the microparticles from the dispersion in which they are made, for example by centrifuging, filtration or spray-drying, and then to blend the microparticles with a solution of a polyester resin (A) in a diluent (B) as before.

As an alternative to the use of dispersion polymerisation methods, the polymer microparticles may, for example, be produced by aqueous emulsion polymerisation of suitable unsaturated monomers, using procedures well known in the art. The microparticles are then obtained in the form of a charge-stabilised dispersion, from which the particles themselves can be separated, e.g. by spray drying. For incorporation into the coating composition, the microparticles are then re-dispersed in the solution in the diluent of the film-forming polyester resin, preferably by methods imparting high shear to the mixture such as pug milling or triple roll milling, in an analogous fashion to the dispersion of a pigment. By further analogy to pigment dispersion, the requisite steric stability of the microparticles may then be achieved simply as a result of an innate tendency of the film-forming polyester resin (which by definition is solvated by the diluent) to associate with the particles, for example through the interaction of polar groups present in the polyester resin and in the microparticle respectively. In producing the microparticles by aqueous emulsion polymerisation, some difunctional unsaturated compounds may be included in the polymerising monomers in order to give rise to a cross-linked polymer which will be insoluble in the solution of the film-forming polyester resin (A) in the diluent (B), whatever the nature of the latter. Here again, as in the case of microparticles made by dispersion polymerisation, it may be desirable to continue the emulsion polymerisation with a second feed of monomers which does not include any difunctional (i.e. cross-linking) material and which gives rise to a polymer which is compatible with the solution of polyester resin (A) in diluent (B), in other words to associate with the miroparticles an 'auxiliary' polymer having the same function as that previously described.

As has already been stated, the polymer microparticles (C) are present in the compositions used according to the invention in an amount of at least 3% of the aggregate weight of the film-forming polymer (A) and of the microparticles.

For the purposes of this definition, the term "polymer microparticles" is to be understood as referring, in the case where auxiliary polymer is employed, to the microparticles proper together with that part of the auxiliary polymer associated therewith which cannot be dissolved away from the particles by the diluent (B), under the conditions of the insolubility test described above. When the compositions are intended for use in the production of finishing coats (as distinct from their use as basecoats, mentioned below), the amount of the polymer microparticles incorporated is preferably from 3% to 30% of the aggregate weight of the film-forming polymer and the miroparticles.

The compositions used in the process of the invention may incorporate, in addition to the polyester resin (A), the diluent (B) and the polymer microparticles (C), pigments as conventionally used in the coatings art. Such pigments may range in particle size from 1 to 50 microns and may be inorganic in nature, for example titanium dioxide, iron oxide, chromium oxide, lead chromate or carbon black, or organic in nature, for example phthalocyanine blue, phthalocyanine green, carbazole violet, anthrapyrimidine yellow, flavanthrone yellow, isoindoline yellow, indanthrone blue, quinacridone violet and perylene red.

Any of the above pigments may be present in the coating compositions in a proportion of from 2% to 50% of the aggregate weight of all the film-forming material present. The term "pigment" is here meant to embrace also conventional fillers and extenders, such as talc or kaolin.

Such pigments may be incorporated into the compositions with the aid of known dispersants, for example an acrylic polymer, which are compatible with the polyester resin (A).

If desired, the compositions may additionally incorporate other known additives, for example viscosity modifiers such as bentone or cellulose acetate butyrate.

As already indicated, there may further be incorporated a cross-linking agent to effect or assist the curing of the polyester resin (A). Suitable types of cross-linking agents include diisocyanates, diepoxides and, especially, aminoplast resins, that is to say, condensates of formaldehyde with nitrogenous compounds such as urea, melamine, thiourea or benzoguanamine, or the lower alkyl ethers of such condensates in which the alkyl groups contain from 1 to 4 carbon atoms. Particularly suitable are melamineformaldehyde condensates in which a substantial proportion of the methylol groups are etherified by reaction with butanol. The proportion of cross-linking agent to cross-linkable acrylic or other polymer in the composition may vary widely, but in general a ratio of from 50:50 to 90:10 by weight of polymer to cross-linking agent is satisfactory. The precise proportion to be employed depends upon the properties required in the final film, but a preferred range affording a good balance of properties is from 60:40 to 85:15 by weight of polymer to cross-linking agent.

The composition may also incorporate a suitable catalyst for the cross-linking reaction, for example an acid-reacting compound such as acid butyl maleate, acid butyl phosphate or p-toluene sulphonic acid. Alternatively, the required catalytic effect may be provided by carboxyl groups present in the film-forming polyester resin (A).

Following spray application of the coating composition to the substrate surface and evaporation of the volatile liquid diluent so as to form a polymer film upon the surface, the polyester resin constituent (A) may then be allowed to cure by atmospheric oxidation, or it may be reacted with a cross-linking agent present, as appropriate. If desired, the curing process may be assisted by heating the coating, for example to a temperature of up to 160° C.

Any of the known spraying procedures may be used for applying the composition, such as compressed air spraying, electrostatic spraying, hot spraying and airless spraying, and either manual or automatic methods are suitable. Under these conditions of application, coatings of excellent gloss are obtained which possess advantages over the coatings obtained according to the prior art in respect of the reduction of excessive flow on application, particularly at sharp edges or corners of a substrate of complicated shape, or the obliteration of scratch marks in the surface to be coated. Films of up to 4 mils dry thickness may be applied without any tendency for sagging to occur.

The invention is illustrated but not limited by the following Examples, in which parts and percentages are by weight.

EXAMPLE 1

(A) Alkyd resin finish composition containing polymer microparticles (1) Preparation of Polymer Microparticles To a vessel fitted with stirrer, thermometer and reflux condenser the following were added:

| | |
|---|---|
| Aliphatic hydrocarbon (boiling range 140–156° C.: zero aromatic content) | 20.016 parts |
| Methyl methacrylate | 1.776 parts |
| Methacrylic acid | 0.036 part |
| Azo-diisobutyronitrile | 0.140 part |
| Graft copolymer stabiliser (33% solution) (as described below) | 0.662 part |

The vessel and contents were purged with inert gas and the temperature then raised to 100° and held there for 1 hour in order to produce a disperse polymer "seed." The following ingredients were pre-mixed and were fed into the vessel at a uniform rate over a period of 6 hours, maintaining stirring and heating at 100° C.:

| | |
|---|---|
| Methyl methacrylate | 32.459 parts |
| Glycidyl methacrylate | 0.331 part |
| Methacrylic acid | 0.331 part |
| Azo-diisobutyronitrile | 0.203 part |
| Dimethylaminoethanol | 0.070 part |
| Graft copolymer stabiliser solution (as described below) | 6.810 parts |
| Aliphatic hydrocarbon (boiling range 140–156° C.) | 33.166 parts |
| | 100.000 parts |

The contents of the vessel were held at 100° C. for a further 3 hours, to give full conversion of the monomers to a fine dispersion containing insoluble polymer gel microparticles (21–22% of the total dispersion) together with uncross-linked polymer particles (23% of the total dispersion).

The graft copolymer stabiliser used in the above procedure was obtained as follows. 12-hydroxystearic acid was self-condensed to an acid value of about 31–34 mg KOH/g (corresponding to a molecular weight of 1650–1800) and then reatced with an equivalent amount of glycidyl methacrylate. The resulting unsaturated ester was copolymerised at a weight ratio of 2:1 with a mixture of methyl methacrylate and acrylic acid in the proportions of 95:5.

(2) Modification of Microparticles with Auxiliary Polymer

To a vessel fitted as described in step (a), there were charged 63.853 parts of the dispersion obtained in step (a) above. The dispersion was heated to 115° C. and the vessel was purged with inert gas. The following ingredients were pre-mixed and were fed at a steady rate, over a period of 3 hours, to the stirred contents of the vessel, the temperature being maintained at 115° C.:

| | |
|---|---|
| Methyl methacrylate | 3.342 parts |
| Hydroxyethyl acrylate | 1.906 parts |
| Methacrylic acid | 0.496 part |
| Butyl acrylate | 3.691 parts |
| 2-Ethylhexyl acrylate | 3.812 parts |
| Styrene | 5.712 parts |
| Azo-diisobutyronitrile | 0.906 part |
| Prim-octyl mercaptan | 0.847 part |
| Graft copolymer stabiliser solution (as described in step (a).) | 1.495 parts |

On completion of the addition, the contents of the vessel were held at 115° C. for a further 2 hours to achieve full conversion of the monomers, and 13.940 parts of butyl acetate were finally added, bringing the total charge to 100.000 parts. The dispersion so obtained had a total film-forming solids content of 45–46%; the content of insoluble gel polymer microparticles was 27.0–27.5%.

(3) Preparation of Millbase

The following ingredients were ground together in a ball mill:

| | |
|---|---|
| Titanium dioxide pigment | 7.8 parts |
| Middle chrome pigment | 27.8 parts |
| Scarlet chrome pigment | 18.1 parts |
| Dispersing resin (49% solids solution in xylene) | 29.6 parts |
| Xylene | 16.7 parts |

(4) Preparation of finish composition

The following ingredients were blended:

| | |
|---|---|
| Millbase (as described in (3) above) | 150.34 parts |
| Melamine/formaldehyde resin (62% solids solution in butanol) | 63.52 parts |
| Alkyd resin solution (as described below) | 133.43 parts |
| Polymer microparticle dispersion (as described in (2) above) | 35.46 parts |
| Dipentene | 24.00 parts |
| Butyl acetate | 8.00 parts |
| Xylene | 51.00 parts |

The alkyd resin solution used in the above formulation was a 63% solids solution in xylene of a 34% oil length resin made by condensing coconut oil, trimethylolpropane, glycerol, benzoic acid and phthalic anhydride in the molar proportions 0.806:3.273:0.192:0.581:3.906 respectively.

(B) Alkyd resin finish not containing polymer microparticles

The following ingredients were blended:

| | |
|---|---|
| microparticles The following ingredients were blended:- | |
| Millbase as described in A(3) above | 150.34 parts |
| Melamine/formaldehyde resin (62% solids solution in butanol) | 63.52 parts |
| Alkyd resin solution (as described in A(4) above) | 157.58 parts |
| Dipentene | 24.00 parts |
| Butyl acetate | 8.00 parts |
| Xylene | 51.00 parts |

(C) Application of Finishes

The compositions prepared as described in (A) and (B) above were applied by spray on to vertical primed steel panels which were punched with 0.25″ diameter holes at 1″ intervals, in such a way that the film thickness progressively increased from the top to the bottom of the panel. The applied coatings were allowed to flash-off for 45 minutes and were then stoved at 130° C. for 10 minutes.

The film thickness at which sagging of the coatings at the rims of the holes first occurred was then estimated. For the composition (A) containing polymer microparticles, the minimum film thickness was 0.0038″; for the composition (B) not containing the microparticles, the minimum film thickness was only 0.0024″.

EXAMPLE 2

Alkyd resin finish compositions containing polymer microparticles at different weight proportions Three compositions, designated I, II and III, were obtained by blending the following ingredients in the proportions shown:

| | I | II | III |
|---|---|---|---|
| Melamine/formaldehyde resin (62% solids solution in butanol) | 60.0 | 72.5 | 60.0 |
| White millbase containing TiO$_2$ | 119.2 | 119.2 | 119.2 |
| Alkyd resin solution (as described below) | 143.1 | 107.9 | 128.2 |
| Silicone oil solution (2%) | 1.2 | 1.2 | 1.2 |
| Isobutyl alcohol | 8.0 | 8.0 | 8.0 |
| Dipentene | 20.0 | 20.0 | 20.0 |
| Xylene | 56.0 | 50.0 | 83.0 |
| Polymer microparticle dispersion (as described | | | |

-continued

|  | I | II | III |
|---|---|---|---|
| in Example 1, part A (2)) | 32.9 | 65.8 | — |
| Thermosetting acrylic polymer, (65% solution) | — | — | 22.9 |
| Determined solids content, % | 51.14 | 50.59 | 50.03 |
| Microparticle content, % non-volatile (based on non-volatile resin components | 5 | 10 | 0 |

Primed metal panels were sprayed with each of the three compositions so as to give a "wedge" coat of gradually varying film thickness. Each panel was allowed to stand vertically for 45 minutes and was then stoved, again in a vertical position, for 10 minutes at 130° C. The film thickness at which "sagging" first occurred was then determined in each case. The panel finished with composition III sagged at a film thickness of 60–65 microns and above, but the panels finished with compositions I and II sagged only at a film thickness of 75 microns and above. The alkyd resin solution used in the above formulation was a 70% solids solution in xylene of a resin made by condensing coconut oil, trimethylolpropane, glycerol and phthalic anhydride in the molar proportions 1.0:4.05:0.5:5.14

EXAMPLE 3

Polyester finish composition containing polymer microparticles, using an alternative cross-linking agent The following ingredients were ground in a ball mill:

| | |
|---|---|
| Nydroxyl group-containing polyester, (hydroxyl content 8.1%, 90% solution in 2-butoxyethyl acetate) | 17.11 parts |
| Polymer microparticle dispersion (as described in Example 1, part A (2)) | 8.39 parts |
| Butyl acetate | 6.20 parts |
| Titanium dioxide | 34.30 parts |

After grinding and removal from the ball mill, the following ingredients were added:

| | |
|---|---|
| Zinc octoate (containing 22% Zn) | 0.80 part |
| Silicone oil solution (2%) | 2.00 parts |
| 2-Ethoxyethyl acetate | 3.10 parts |
| Butyl acetate | 2.80 parts |

To the above charge there was added 15.15 parts of an aliphatic polyisocyanate (100% non-volatile content, NCO content 23.5%). After mixing, the resulting composition was sprayed on to a primed panel in the manner described in Example 2, allowed to flash-off for 30 minutes and then stoved for 30 minutes at 80° C.

A similar composition was prepared but omitting the polymer microparticles. On spray application as described in Example 2, this was observed to have significantly poorer resistance to sagging than the above composition containing the microparticles.

We claim:

1. A process for the production of a surface coating upon a substrate which comprises applying by spray to the substrate surface a composition comprising:
   (a) a film-forming polyester resin which is selected from the group consisting of products of condensation of a polyhydric alcohol and a polycarboxylic acid and products of condensation of a polyhydric alcohol, a polycarboxylic acid and a constituent supplying the residue of a fatty acid derived from a natural drying, semi-drying or non-drying oil;
   (B) a volatile organic liquid diluent in which the polyester resin (A) is dissolved;
   (C) polymer microparticles of diameter 0.01 to 10 microns which are insoluble in the solution of the polyester rein (A) in the diluent (B) and are stably dispersed therein in a non-flocculated state by means of a steric barrier around the particles of polymer chains which are solvated by the said solution, in an amount of at least 3% of the aggregate weight of the resin (A) and the microparticles, which are insoluble in and stably dispersed in the solution of the polyester resin in the diluent (B),
said microparticles being further associated with an auxiliary polymer which is soluble in the volatile organic liquid constituent (B) of the composition and which also is compatible with the film-forming resin (A), and subsequently evaporating the volatile diluent (B) and forming a polymer film upon the surface.

2. A process as claimed in claim 1, wherein the polymer is a polymer or copolymer of one or more alkyl esters of acrylic acid or methacrylic acid.

3. A process as claimed in claim 1, wherein the polymer microparticles have been produced by the dispersion polymerisation of monomers in an organic liquid, in which the resulting polymer is insoluble, in the presence of a steric stabiliser for the particles.

4. A process as claimed in claim 3, wherein the steric stabiliser used in the production of the polymer microparticles is a graft copolymer comprising a polymer backbone which is not solvatable by the organic liquid and is capable of becoming anchored to the polymer microparticles and a plurality of polymer chains pendant from the backbone which are solvatable by the organic liquid.

5. A process as claimed in claim 1, wherein the microparticles have been associated with auxiliary polymer by following up the dispersion polymerisation process, whereby the microparticles are obtained, immediately with the polymerisation of further monomer, from which the auxiliary polymer is to be derived, in the original inert liquid medium and in the presence of the original stabilising agent.

6. A process as claimed in claim 1, wherein the polymer microparticles (C) are present in an amount of from 3% to 30% of the aggregate weight of the film-forming polymer (A) and the microparticles (C).

* * * * *